US006385900B1

(12) United States Patent
George

(10) Patent No.: US 6,385,900 B1
(45) Date of Patent: May 14, 2002

(54) SUPPORT AND IRRIGATOR FOR A PLANTING

(76) Inventor: Gary F. George, 1589 Aline Dr., Grosse Pointe Woods, MI (US) 48236

( * ) Notice: Subject to any disclaimer, the term of this patent is extended or adjusted under 35 U.S.C. 154(b) by 0 days.

(21) Appl. No.: 09/681,852

(22) Filed: Jun. 18, 2001

Related U.S. Application Data
(60) Provisional application No. 60/231,737, filed on Sep. 11, 2000.

(51) Int. Cl.[7] .............................................. A47G 33/12
(52) U.S. Cl. ................................ 47/40.5; 47/42; 47/45; 47/48.5
(58) Field of Search .................................. 47/40.5, 57.6, 47/42, 48.5, 66.1, 66.3, 79

(56) References Cited

U.S. PATENT DOCUMENTS

| | | | |
|---|---|---|---|
| 1,244,576 A | * 10/1917 | Arnold | |
| 3,005,287 A | * 10/1961 | Dudley | |
| 3,816,959 A | * 6/1974 | Nalle, Jr. .......................... | 47/23 |
| 3,896,586 A | * 7/1975 | Caldwell .......................... | 47/28 |
| 4,087,938 A | 5/1978 | Koch ............................. | 47/48.5 |
| 4,249,342 A | 2/1981 | Williams ......................... | 47/43 |
| 4,268,992 A | * 5/1981 | Scharf ............................ | 47/23 |
| 4,336,666 A | * 6/1982 | Caso .............................. | 47/48.5 |
| 4,520,590 A | 6/1985 | Schuh ............................ | 47/43 |
| 4,562,662 A | 1/1986 | Ten Pas .......................... | 47/43 |
| 4,745,706 A | 5/1988 | Muza et al. ..................... | 47/47 |
| 4,870,781 A | 10/1989 | Jones ............................. | 47/43 |
| 4,922,653 A | 5/1990 | Stone ............................. | 47/45 |
| 5,117,582 A | 6/1992 | Cissel, Jr. et al. .............. | 47/25 |
| 5,263,278 A | * 11/1993 | Valenti ......................... | 47/48.5 |
| 5,605,010 A | 2/1997 | Furlong et al. ............... | 47/48.5 |
| 5,901,497 A | 5/1999 | Bulvin ......................... | 47/48.5 |
| 5,913,477 A | 6/1999 | Dean ............................ | 239/289 |

* cited by examiner

Primary Examiner—Peter M. Poon
Assistant Examiner—Andrea M. Valenti
(74) Attorney, Agent, or Firm—Gifford, Krass, Groh, Sprinkle, Anderson & Citkowski, P.C.

(57) ABSTRACT

A combination support and irrigator for a planting having an upwardly extending trunk is disclosed. The device includes a housing having an upper end, a lower end and defining an interior chamber. The lower end is adapted to be positioned on a ground support surface while an opening at the upper end of the housing is dimensioned to circumscribe the trunk of the planting and limit the deflection of the trunk. A plurality of stakes extend downwardly from a lower end of the housing and are adapted for insertion into the ground support surface. At least one of the stakes includes a fluid passage extending between a distal end of the stake and the interior chamber of the housing so that a liquid contained within the housing flows from the housing chamber, through the stake and into the ground support surface.

9 Claims, 1 Drawing Sheet

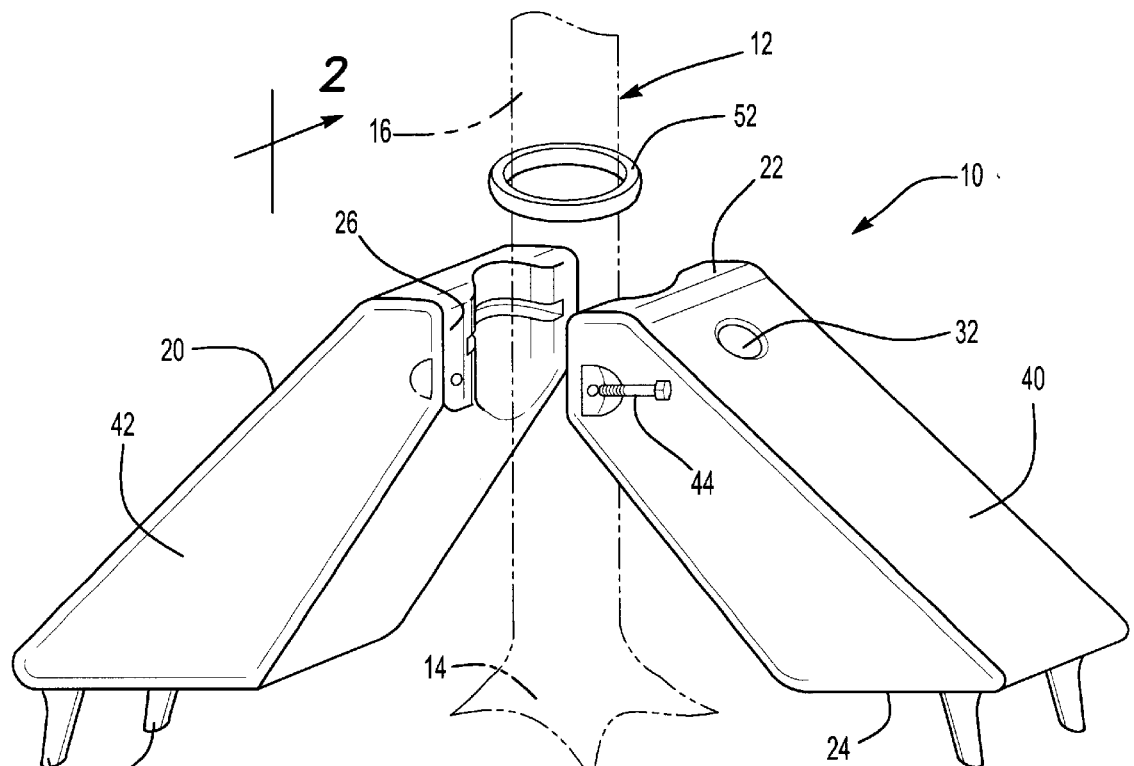
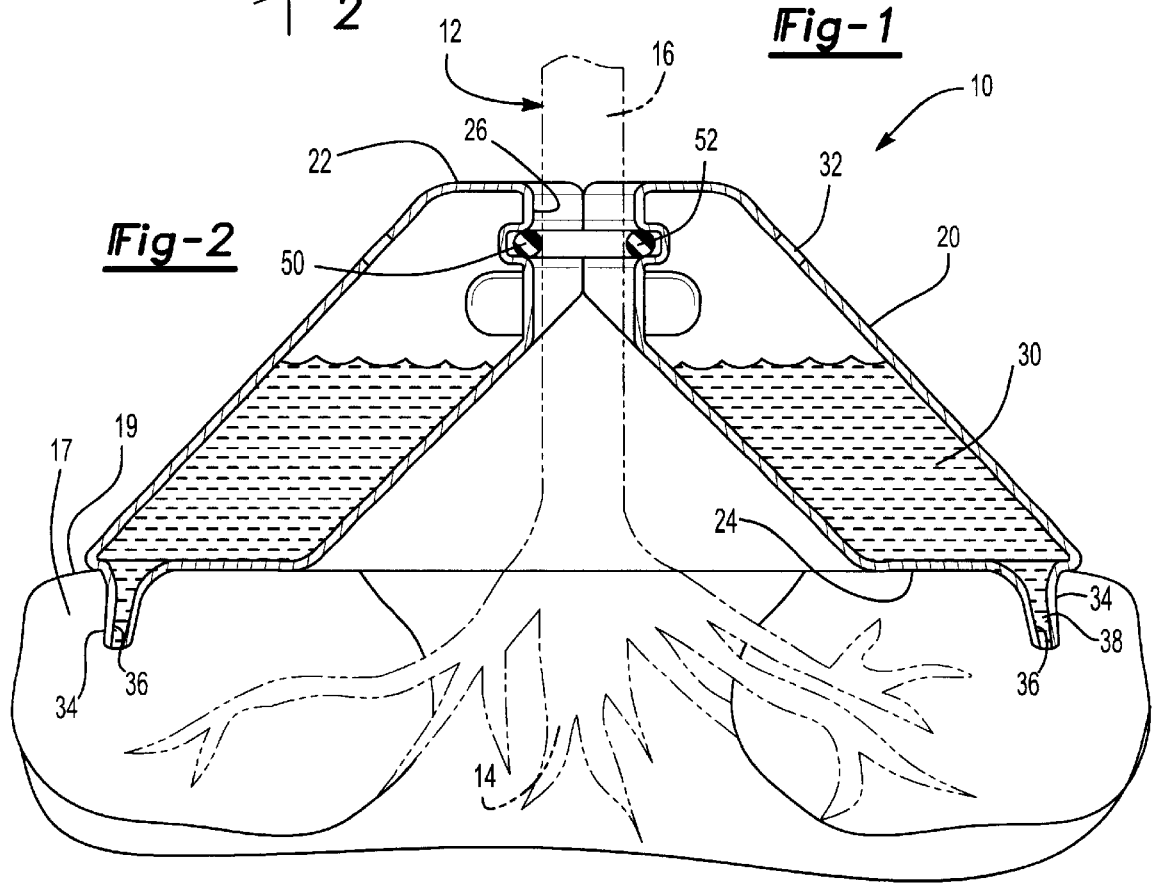

SUPPORT AND IRRIGATOR FOR A PLANTING

CROSS REFERENCE TO RELATED APPLICATIONS

This application claims priority of U.S. Provisional Patent Application No. 60/231,737 filed Sep. 11, 2000, which is incorporated herein by reference.

BACKGROUND OF INVENTION

1. Field of the Invention

The present invention relates generally to a combination support and irrigator for a planting having an upwardly extending trunk.

2. Description of Related Art

Conventionally when plantings, such as small trees, are transplanted, the planting includes a lower root ball. The root ball is positioned within a hole in the ground. However, after the initial transplant of the planting, the planting itself, without more, has insufficient structural strength to remain erect during high winds or the like.

Consequently, it has been the previously known practice to secure the planting to the ground using a number of stakes positioned around the tree and with wires extending between the stakes and the tree. These stakes and wires thus support the planting during high winds and retain the planting in an upright position. This previously known method of supporting a planting, however, has several disadvantages.

One disadvantage of this previously known method for supporting the planting is that the wires can damage the planting, especially when the wires are fastened too tight around the planting. Furthermore, the support wires can result in restricted growth for the planting when the guide wire is positioned too tight as well as distortion of the branches unless the wires are periodically adjusted to compensate for growth.

A still further disadvantage of this previously known method for supporting a transplant planting is that the roots within the root ball oftentimes fail to satisfactorily grow laterally outwardly from the root ball but, instead, remain substantially contained within the root ball itself. When this occurs, root rot of the root ball can occur from over watering of the planting. Furthermore, unless the roots grow sufficiently laterally outwardly from the root ball, the root system for the planting will not adequately support the planting once the support wires are removed.

SUMMARY OF INVENTION

The present invention provides a combination support and irrigator for a planting which overcomes all of the above-mentioned disadvantages of the previously known devices.

In brief, the device of the present invention comprises a housing having an upper end, a lower end and in which the housing defines an interior chamber. The lower end of the housing is adapted to be supported on a ground support surface.

The housing also includes an opening at its upper end which is dimensioned to circumscribe the trunk of the planting and limit the deflection of the planting trunk and thus support the trunk in a generally upright position. A resilient bumper is optionally provided around the housing opening so that the bumper abuts against the planting trunk and protects the planting trunk from damage from the housing and also permits limited deflection of the planting trunk.

A plurality of stakes extend downwardly from the lower end of the housing, and these stakes are adapted for insertion into the ground support surface thus removably securing the housing to the ground support surface. At least one stake includes a fluid passage extending between a distal end of the stake and the interior chamber of the housing. Consequently, when the interior chamber of the housing is filled with water or other liquids, such as water and fertilizer, the liquid flows from the housing chamber, through the stake and into the ground surface thus nourishing the planting.

Since the stakes are implanted into the ground support surface, the water saturation of the ground surrounding the planting limits the rate of fluid flow from the housing chamber and into the ground. Furthermore, since the liquid from the chamber enters the ground below the ground support surface, evaporation of the liquid after its outflow from the housing is minimized.

Preferably, the housing slopes outwardly from its upper end and towards its lower end so that the lower end of the housing is positioned laterally outwardly from the root ball from the planting. Consequently, as the water or water/fertilizer combination from the housing chamber flows into the ground surrounding the planting, the liquid encourages the lateral outgrowth of the planting roots from the root ball thus enhancing the root system for the planting.

BRIEF DESCRIPTION OF DRAWINGS

A better understanding of the present invention will be had upon reference to the following detailed description, when read in conjunction with the accompanying drawing, wherein like reference characters refer to like parts throughout the several views, and in which:

FIG. 1 is a perspective view illustrating a preferred embodiment of the present invention; and FIG. 2 is a longitudinal sectional view illustrating the preferred embodiment of the present invention.

DETAILED DESCRIPTION

With reference first to FIGS. 1 and 2, a preferred embodiment of the device 10 of the present invention is there shown for use with a planting 12, such as a small tree. In the conventional fashion, the planting 12 includes a root ball 14 and a trunk 16 extending generally vertically upwardly from the root ball 14. The root ball 14 is positioned within a hole in the ground 17 (FIG. 2) having a ground support surface 19.

The device 10 generally comprises a housing 20 having an upper end 22 and a lower end 24. A vertically aligned cylindrical opening 26 is formed at the upper end 22 of the housing 20, and this opening 26 is dimensioned so that it circumscribes the trunk 16 of the planting at a position spaced upwardly from the ground support surface 19.

Conversely, the lower end 24 of the housing 20 is adapted to be positioned on and supported by the ground support surface 19. With the housing 10 positioned around the planting 12 such that the trunk 16 of the planting 12 extends through the opening 26, the housing 20 slopes generally outwardly from its upper end 22 and to its lower end 24.

As best shown in FIG. 2, the housing 20 includes an interior fluid chamber 30 having a fill opening 32 adjacent the upper end 22 of the housing. At least one, and preferably several, stakes 34 extend downwardly and outwardly from the lower end 24 of the housing 20 and these stakes 34 are adapted for insertion into the ground 17 thus firmly, but removably, securing the housing 20 to the ground support surface 19.

At least one, and preferably all, of the stakes 34 include a fluid passageway 36 extending from a distal end 38 of the stake 34 and to the housing chamber 30. Thus, when the housing chamber 30 is filled with a liquid, such as water or a water/fertilizer mixture, the liquid slowly seeps out from the housing chamber 30, through the stakes 34 and into the ground 17 at a position below the ground support surface 19. The rate of flow of the liquid from the housing chamber 30 into the ground 17 will depend upon the liquid saturation of the ground 17.

The stakes 34 are preferably positioned adjacent the lower end 24 of the housing 20 spaced most laterally away from the housing upper end 22, and thus most laterally spaced from the trunk 16 of the planting 12. Furthermore, the housing 20 is dimensioned so that, with the stakes 34 positioned in the ground 17, the distal ends 38 of the stakes 34 are spaced laterally outwardly from the root ball 14 so that the water or water/fertilizer mixture from the housing chamber 30 is introduced into the ground 17 at a position spaced laterally outwardly from the root ball 14. This in turn encourages lateral outward growth of the roots from the root ball 14 which enhances and strengthens the root system for the planting 12.

With reference now to FIG. 1, preferably the housing 20 is constructed from two housing parts 40 and 42 which are identical to each other. The housing parts 40 and 42 are secured together in any conventional fashion, such as by threaded fasteners 44, so that the entire housing 10 is firmly, but removably, secured around the planting 12. Preferably, the housing parts 40 and 42 are constructed by blow molding.

With reference now particularly to FIG. 2, an annular channel 50 is provided in the housing 20 around a midpoint of the opening 26 such that the channel 50 faces the trunk 16 of the planting 12. A resilient bumper 52 is removably positioned within this channel 50 so that, upon deflection of the planting trunk 16, the planting trunk 16 contacts the bumper 52, rather than the housing 20. The bumper 52 thus protects the trunk 16 of the planting 12 from damage by the housing 10 and still permits limited deflection of the planting trunk 16.

From the foregoing, it can be seen that the device of the present invention provides a combination support and irrigator for a planting which not only supports the trunk of the planting in a generally vertical position, but also provides water and/or nutrients to the planting at a position spaced outwardly from the root ball. Furthermore, the present invention accomplishes these advantages without the previously known disadvantages of the previously known practice of "staking" the planting to the ground.

Having described my invention, however, many modifications thereto will become apparent to those skilled in the art to which it pertains without deviation from the spirit of the invention as defined by the scope of the appended claims.

I claim:

1. A combination support and irrigator for a planting having an upwardly extending trunk comprising:
    a housing having an upper end, a lower end and defining an interior chamber, said lower end of said housing adapted to be positioned on a ground support surface,
    said housing having an opening at said upper end dimensioned to circumscribe the trunk of the planting and limit deflection of the trunk,
    a plurality of stakes extending outwardly from said lower end of said housing and adapted for insertion into the ground support surface, at least one of said stakes including a fluid passage extending between a distal end of said at least one stake and said interior chamber of said housing,
    a resilient toroidal bumper positioned at said upper end of said housing, said bumper having an inside diameter dimensioned to minimize deflection of the trunk of the planting,
    wherein a liquid contained within said housing chamber flows from said housing chamber, through said at least one stake and into the ground support surface.

2. The invention as defined in claim 1 wherein said housing and said stakes are of a one-piece construction.

3. The invention as defined in claim 2 wherein said housing and said stakes are made of plastic.

4. The invention as defined in claim 1 wherein said housing comprises a first part and a second part, said parts being substantially identical to each other, and a fastener which secures said housing parts together.

5. The invention as defined in claim 4 and comprising a fill opening formed through each housing part adjacent said upper end of said housing.

6. The invention as defined in claim 1 wherein said housing slopes outwardly from said upper end of said housing to said lower end of said housing.

7. The invention as defined in claim 6 wherein said housing slopes outwardly such that an upper surface of said housing forms an acute angle with respect to the ground support surface.

8. The invention as defined in claim 6 wherein said at least one stake is positioned on said lower end of said housing adjacent a portion of said housing most laterally spaced from said upper end of said housing.

9. The invention as defined in claim 1 and comprising a channel formed around said upper end of said housing, said resilient bumper being positioned in said channel.

* * * * *